United States Patent

[11] 3,609,037

[72] Inventor Shigeru Suzuki
        Kanagawa-ken, Japan
[21] Appl. No. 806,825
[22] Filed Mar. 13, 1969
[45] Patented Sept. 28, 1971
[73] Assignee Kabushiki Kaisha Ricoh
        Tokyo, Japan
[32] Priority Mar. 19, 1968
[33] Japan
[31] 43/18141

[54] SLIT EXPOSURE OPTICAL SYSTEM
3 Claims, 2 Drawing Figs.
[52] U.S. Cl. .................................................. 355/66,
                                                        355/18
[51] Int. Cl. ............................................ G03b 27/70
[50] Field of Search ................................. 355/66, 50,
                                                        51, 18

[56] References Cited
FOREIGN PATENTS
455,489   1968   Switzerland ................. 355/66

Primary Examiner—Samuel S. Matthews
Assistant Examiner—D. J. Clement
Attorney—Burgess, Ryan and Hicks ABSTRACT: A slit exposure optical system having a fixed original to be copied and parallelly spaced advancing photocopying paper. A lens is located between the original and photocopying paper and is associated with two reflecting mirrors to transfer an image from the original to the photocopying paper. The lens and each reflecting mirror are movable at different related speeds to maintain the optical path between the lens and the original equal to the optical path between the lens and the photocopying paper.

PATENTED SEP 28 1971 3,609,037

INVENTOR
SHIGERU SUZUKI
BY Burgess, Ryan + Hicks
ATTORNEYS

3,609,037

SLIT EXPOSURE OPTICAL SYSTEM

BACKGROUND OF THE INVENTION

The present invention relates to a slit exposure optical system and more particularly to a slit exposure optical system especially suited for use in a photocopying machine or the like.

Known is an optical system in which an exposure optical system, an original holder and a photocopying paper supporting stand are displaced from one another for effecting the slit exposure upon a light-sensitive sheet material, (hereinafter referred to as photocopying paper). In case of a photocopying machine employing such optical system of the type described, a photocopying paper is transported once to an exposure position where the paper is stopped stationarily maintaining the surface of the paper as planar as possible. Therefore, photocopying advancing means having a high degree of accuracy in operation, means for maintaining the photocopying paper in planar form and a photocopying support stand having a wide area sufficient enough to cover the whole exposure area are required. Furthermore, in a photocopying machine wherein relatively large-sized members such as the supporting stand as described above must be driven, a large driving power is required and the accurate movements of such members are extremely difficult. These defects also present serious problems in making the photocopying machine or the like compact in size and simple in construction.

The primary object of the present invention is therefore to provide a slit exposure optical system which can completely eliminate such defects as described above and serves to render the photocopying machine or the like simple in construction, light in weight, compact in size and efficient in operation.

SUMMARY OF THE INVENTION

The primary object of the present invention for eliminating the defects of the conventional slit exposure optical system can be attained by the slit exposure optical system of the present invention comprising an original holder, a slit, both of said holder and slit being held stationary, said slit being disposed adjacent to a photocopying paper, a photocopying lens having a reflecting mirror integrally disposed at the rear surface of said lens, means for directing the lights emanating from the original upon said original holder toward said photocopying lens and means for directing the lights emanating from said slit toward said slit, said first and second mentioned means and said photocopying lens being adapted to be displaced at predetermined speeds in the directions normal to and/or parallel with the surface of the original.

According to a preferred embodiment of the present invention, said first and second means for directing the lights emanating from the original and said lens toward said lens and said slit respectively are comprised of a first and a second movable reflecting mirrors disposed at 45° relative to an imaginary plane containing the optical axis of said photocopying lens on both sides of said imaginary plane respectively with the intersecting lines of the reflecting surfaces of said reflecting mirror with the imaginary plane being at right angles to the optical axis of said lens. Both of said reflecting mirrors and said photocopying lens are displaced in the direction normal to and toward to the surface of the original upon the original holder at a speed one-half the speed of advancing the photocopying paper while the first movable reflecting mirror and the photocopying lens are displaced along the optical axis of the lens in the direction same with that of the advancement of the photocopying paper at speeds the same with and one-half said photocopying paper advancing speed. Therefore, the optical length between the surface of the original and the photocopying lens can be always maintained the same with the optical length between this lens to the surface of the photocopying paper. Since the speed of advancing the photocopying paper is made equal to the speed of the first movable reflecting mirror for scanning the surface of the original, the photocopying operation can be completely accomplished with accuracy.

The above and other objects, features and advantages of the present invention will become more apparent from the following description in conjunction with the accompanying drawing.

DESCRIPTION OF THE PREFERRED EMBODIMENT

Figure 1:
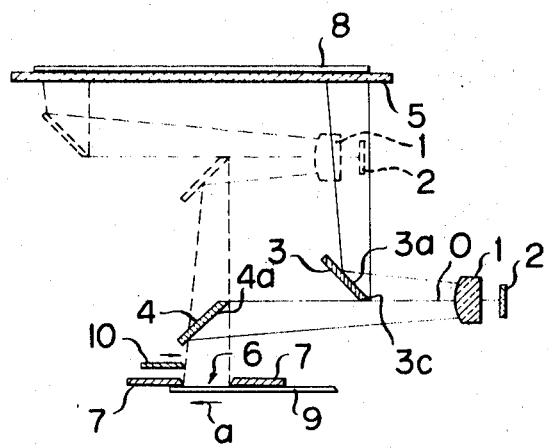
FIG. 1 is a sectional view of one embodiment of a slit exposure optical system of the present invention.
Figure 2:
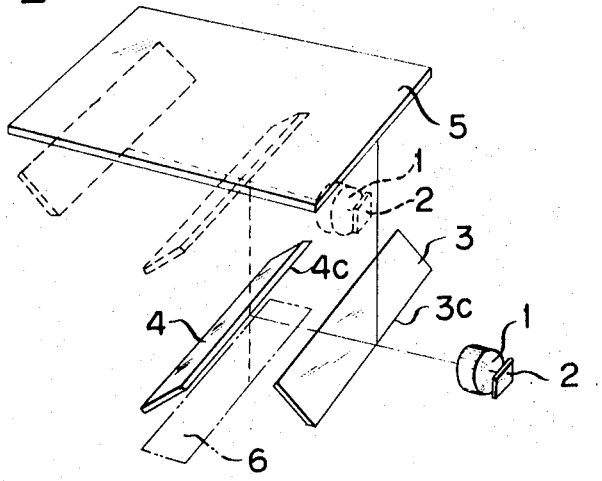
FIG. 2 is a perspective view thereof.

Referring to FIG. 1, a photocopying lens 1 has a reflecting mirror 2 disposed in integral relation therewith. A first reflecting mirror 3 and a second reflecting mirror 4 are disposed at 45° relative to an imaginary plane containing the optical axis O of the lens 1 (a plane perpendicular to the paper in FIG. 1) on both sides of this imaginary plane respectively in opposed relation with the copying lens 1. The reflecting surfaces 3a and 4a of the first and second reflecting mirrors 3 and 4 are directed outwardly of the imaginary plane. Both of the intersecting lines between the imaginary plane and the reflecting surfaces 3a and 4a of the reflecting mirrors 3 and 4, that is one side edge each of these mirrors, are disposed at right angles to the optical axis O of the photocopying lens 1. A transparent original holder 5 is disposed on the same side of the reflecting mirror 3 and in parallel with the imaginary plane. Upon a plane on the other side of the imaginary plane and in parallel therewith is disposed a shielding plate 7 having a slit 6 positioned in opposed relation with the second reflecting mirror 3. An original 8 is placed upon the surface of the original holder on the opposite side thereof relative to the reflecting mirror 3 with the image of the original being directed toward thereto. A photocopying paper 9 is advanced below the shielding plate 7 with the sensitized surface of the paper 9 being directed upwardly and toward the reflecting mirror 4. When the original 8 is illuminated by the light emanating light emanating from a light source (not shown) disposed in the vicinity of the reflecting mirror 3, the reflected light is further reflected and made incident upon the copying lens 1 where the light is focused and further reflected by the reflecting mirror 2. The reflected light from the reflecting mirror 2 is focused upon the sensitized surface of the copying paper 9 through the reflecting mirror 4 and the slit 6 of the shielding plate 7. The copying paper 9 is moving at a speed of $a$ across the slit 6 by a suitable supporting stand (not shown) in parallel with the plate 7 so that all of the images of the original 8 to be copied can be focused upon the copying paper 9 without any deviation and distortion. For this purpose, the copying lens 1 as well as the three reflecting mirrors are arranged so as to displace themselves at a speed which is a function of the speed $a$ of the copying paper 9. That is, the reflecting mirror 3, the copying lens 1 and the reflecting mirror 4 move in the direction normal to the original holder 5 at a speed of ½a while the reflecting mirror 3 and the copying lens 1 are moved in the direction of the optical axis O of the lens 1 at speeds of $a$ and ½a respectively. That is, the reflecting mirror 3 moves from its initial position along the line slanted at an angle of 30° relative to the imaginary plane at a speed of $\sqrt{5}/2 a$; the lens 1, along the straight line at 45° to the imaginary plane at a speed of $a/\sqrt{2}$; and the second reflecting mirror 4, along the straight line normal to the imaginary plane at a speed of ½a toward the original holder. The initial positions of the copying lens 1 and the reflecting mirrors 3 and 4 are determined in accordance to the direction of advance of the photocopying paper 9. In this case, one side edge, that is the lower side edge nearer to the copying lens 1 of the reflecting mirror 3 is aligned with the leading side edge of the original 8 as best shown in FIG. 1. Thereafter, the positions of the copying lens 1 and the second reflecting mirror 4 are determined based upon the thus determined position of the first reflecting mirror 3. Thus, the length of the optical path from the copying lens 1 to the original 8 can be always maintained the same with the length of the optical path between the optical lens 1 and the copying paper 9 so that the images of the original can be all focused upon the photocopying paper 9 without any deviation or distortion.

The intensity of light incident upon the copying paper 9 can be adjusted by means of an aperture member 10 movably disposed on the same side with that of the slit 6 upwardly and along the side edge thereof remote from the copying lens 1. The shielding plate 7 is fixed in stationary position so that the operation of the aperture member 10 from the exterior of the photocopying machine can be effected in a simple manner without the necessity of special provision.

According to the present invention, it is possible to focus the image of the original held stationarily upon the surface of a moving photocopying paper such as rolled paper. It is therefore clear that the continuous photocopying operation can be effected only by use of the simple photocopying-paper-advancing mechanism such as rolled-paper-advancing mechanism, opposed to the conventional complicated paper-advancing mechanism and/or stopping mechanism. Furthermore, it is necessary that the sensitized surface of the copying paper 9 is held in planar position only at one portion thereof in dimensions corresponding to the width and the length of the slit 6 so that a large-sized copying paper supporting plate or stand is not required. Further advantage of the present invention is the easier exposure light adjustment without the necessity of a special mechanism because the exposure is made through a slit according to the present invention. Now it is clear that the features of the present invention are very effective to render the photocopying machines or the like compact in size and simple in construction with increased photocopying efficiency.

The present invention has been so far described in detail with particular reference to one preferred embodiment thereof, but it is to be understood that the variations and modifications can be effected without departing the true spirit of the present invention as described hereinabove and as claimed in the appended claims.

I claim:

1. A slit exposure optical system for use in a photocopying machine comprising
   a fixed transparent holder having an original thereon to be copied;
   photocopying paper spaced from said holder and adapted to be advanced at a predetermined speed relative thereto past a stationary slit to receive a reflected image from said original;
   a photocopying lens having an associated mirror integrally connected therewith and located between said holder and said photocopying paper in a first position at the start of photocopying closer to said photocopying paper than said holder;
   said lens having an optical axis, and said holder and said photocopying paper positioned in parallel relation to said axis;
   a first reflecting mirror spaced from said lens and having a first position at the start of photocopying where said first reflecting mirror is located on one side of said axis at an angle thereto with one edge thereof in line with said axis;
   a second reflecting mirror having a first position at the start of photocopying spaced from said first reflecting mirror on the side remote from said lens, said second reflecting mirror located on the other side of said axis at an angle thereto with one edge thereof in line with said axis;
   said lens having a second position at the termination of photocopying provided by being simultaneously advanced in a direction normal to said holder at half of said predetermined speed and advanced parallel to said holder at half of said predetermined speed to be located closer to said holder than said photographing paper;
   said first reflecting mirror having a second position at the termination of photocopying provided by being simultaneously advanced in a direction normal to said holder at half of said predetermined speed and advanced parallel to said holder at said predetermined speed to be located closer to said holder than said photocopying paper; and
   said second reflecting mirror having a second position at the termination of photocopying provided by being advanced in a direction normal to said holder at half of said predetermined speed to be located closer to said holder than said photocopying paper.

2. A slit exposure optical system according to claim 1 in which each said first and second reflecting mirrors are positioned at 45° to said axis, the movement of said lens from said first to said second position is along a straight line at 45° to said axis, the movement of said first reflecting mirror from said first to said second position is along a straight line at 30° to said axis, and the movement of said second reflecting mirror from said first to said second position is along a straight line at 90° to said axis.

3. A slit exposure optical system according to claim 1 in which said one edge of said first reflecting mirror in said first position is aligned with an edge of the original placed on said holder.